Sept. 8, 1953

R. S. HAHN 2,651,223

APPARATUS FOR CUTTING METALS

Filed Jan. 13, 1950

INVENTOR.
ROBERT S. HAHN
BY
Albert G. Blodgett
ATTORNEY

Sept. 8, 1953  R. S. HAHN  2,651,223
APPARATUS FOR CUTTING METALS
Filed Jan. 13, 1950  4 Sheets-Sheet 3

INVENTOR.
BY ROBERT S. HAHN
Albert G. Blodgett
ATTORNEY

Sept. 8, 1953     R. S. HAHN     2,651,223
APPARATUS FOR CUTTING METALS
Filed Jan. 13, 1950     4 Sheets-Sheet 4

INVENTOR.
ROBERT S. HAHN
BY
ATTORNEY

Patented Sept. 8, 1953

2,651,223

UNITED STATES PATENT OFFICE 2,651,223

APPARATUS FOR CUTTING METALS

Robert S. Hahn, Northboro, Mass., assignor to The Heald Machine Company, Worcester, Mass., a corporation of Massachusetts Application January 13, 1950, Serial No. 138,333

3 Claims. (Cl. 77—58)

This invention relates to apparatus for cutting metals, and more particularly to tools adapted for operations such as turning, boring, facing and the like, in which the tool reduces the size of a work piece by shearing a chip therefrom.

Many years ago it was proposed to construct a tool with a circular cutting edge, and to rotate the tool about an axis perpendicular to the plane of the circle and extending through the center thereof. Thus new portions of the cutting edge would be brought into contact with the work piece continuously, with the expectation that the life of the tool would be greatly prolonged. In some of the early disclosures, it was intended that the rotation of the tool should be brought about by its contact with the work piece, thus eliminating the need for a tool-rotating mechanism. However, none of these prior disclosures has had any appreciable success or has brought about any noticeable change in the art of cutting metals. This is believed to have been due to the failure of those working in this art to recognize certain important facts and to take these facts into proper consideration in the construction of the tools.

It is accordingly one object of the invention to provide a simple and dependable metal cutting tool which can be kept in service for a comparatively long period before its cutting edge will need sharpening.

It is a further object of the invention to provide an improved construction and arrangement for a rotatable metal cutting tool such that the life of the tool will be greatly prolonged and the surface finish of the work will be improved.

It is a further object of the invention to provide a rotatable metal cutting tool which can be operated successfully at cutting speeds far in excess of anything heretofore known in the art.

It is a further object of the invention to provide a rotatable metal cutting tool which can be readily made of extremely hard materials, such as cemented tungsten carbide.

It is a further object of the invention to provide a rotatable metal cutting tool which is particularly adapted for use in boring an internal or concave surface of a work piece.

It is a further object of the invention to provide a commercially practical and successful rotatable metal cutting tool which will be rotated automatically by its engagement with a work piece.

With these and other objects in view, as will be apparent to those skilled in the art, the invention resides in the combination of parts set forth in the specification and covered by the claims appended hereto.

When a work piece is being turned, bored, faced or the like by means of a tool having a cutting edge shaped as a circle or circular arc, the cutting edge will be substantially tangent to a portion of the surface which has just been machined. Consequently one edge of the chip being sheared from the work piece will be very thin, although the opposite edge may be of considerable thickness, particularly if the depth of the cut is large and the rate of feed is heavy. The machining action produces a work hardening of the outermost layer of the metal. Because of this work hardening and the extremely small depth of cut adjacent the point of tangency, the portion of the cutting edge near this point will tend to ride over the surface of the work piece, rather than to cut the same, particularly if the radius of the cutting edge is relatively large. This will cause the pressure between the tool and the work piece to increase until it is sufficient to bring about penetration of the work hardened surface of the work piece by the cutting edge, whereupon the pressure will suddenly diminish and the tendency will be for the tool to cut too deeply into the work piece for an instant and then to ride over the surface thereof once more. This will result in a vibration or chattering of the tool and the work piece, which will shorten the life of the tool and produce a poor finished surface on the work. If the radius of the cutting edge is increased, the width of the chip will be increased, and the angle between the two surfaces of the chip forming its thin edge will be decreased. Hence the width of the relatively thin chip area, where the tool tends to ride over the material of the work piece, will be increased, and there will be an increased tendency toward chattering. If the radius of the tool is made small enough the operation will be stable, but if the radius is increased a point will eventually be reached at which excessive chattering will occur. Hence it is of great importance to provide as small a radius for the cutting edge as is feasible in each particular case.

Previous inventors in the field of rotatable cutting tools have failed to recognize the facts set forth above. Particularly in the case of tools intended to be rotated by the engagement of the work piece therewith, they have provided tools with cutting edges of large diameter, greatly exceeding the diameter of the bearing surfaces which support the tool. Their apparent purpose in providing large diameter cutting edges was to position the frictional turning forces at a greater distance from the axis of tool rotation, in order to provide greater torque to overcome bearing friction. As a result, the prior bearings have been incapable of supporting the rotating tools properly against the large separating forces caused by the large diameter cutting edges, the operation has been highly unstable, and excessive chattering has occurred.

In accordance with the present invention, in its preferred form, a rotatable tool is provided with a circular cutting edge which is relatively small in diameter, and the tool is supported in bearings of such a low frictional resistance as to ensure rotation of the tool by its engagement with the work despite the small diameter of the cutting edge. The tool is mounted in a radial bearing having a diameter at least slightly exceeding the diameter of the cutting edge. An anti-friction type of thrust bearing is provided for the tool. Preferably the cutting edge is formed by the intersection of a cylindrical clearance surface and a plane rake surface which extends at right angles with the axis of the tool. In one form of the invention there is provided a rotatable tool of such a compact construction that it can be employed in boring holes of relatively small diameter, the arrangement being such that proper clearance may be obtained without excessive negative rake.

Referring to the drawing illustrating one embodiment of the invention, and in which like reference numerals indicate like parts, Fig. 1 is a plan view of a rotatable tool in operation turning an external cylindrical surface on a rotating work piece, the tool having a forward tilt;

Figure 1:
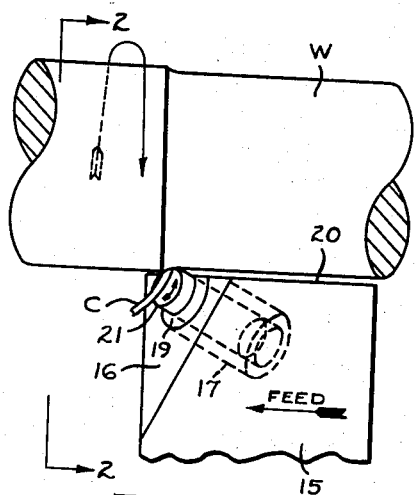
Figure 4:
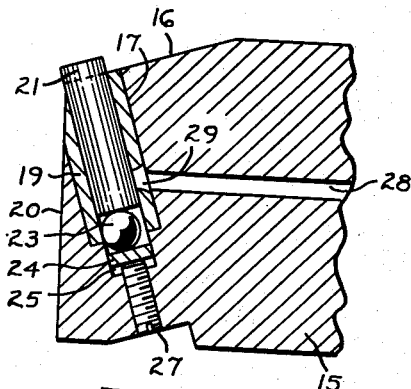
Fig. 4 is a view taken in section on the line 4—4 of Fig. 3.

The embodiment illustrated in Figs. 1 to 4 comprises a heavy horizontal bar 15 of rectangular cross section positioned at right angles with respect to a generally cylindrical work piece W which is rotating about a horizontal axis. The bar 15 is moved in a horizontal lateral direction parallel with the axis of the work piece, as indicated by the arrow marked "Feed" in Fig. 1.

At the inner forward portion of the bar 15 there is provided an inwardly and forwardly inclined upper plane surface 16 through which there extends a cylindrical bore 17 with its axis substantially perpendicular to the surface 16. A cylindrical bushing 19, preferably of a suitable hard material, such as cemented tungsten carbide, is mounted with a tight press fit within the bore 17. The upper portion of the bore intersects a portion of the inner end surface 20 of the bar 15, and the corresponding portion of the bushing 19 is flattened to lie in a common plane with this surface 20. The bushing 19 forms a plain radial bearing for a rotatable tool 21 with a cylindrical outer surface and plane end surfaces at right angles with the axis of the tool. This tool 21 is a close running fit within the bushing 19. Its upper end extends somewhat beyond the upper end of the bushing, and its lower end is spaced upwardly from the lower end of the bushing by a distance slightly exceeding the radius of the tool. Directly beneath the lower end of the tool 21 there is provided a spherical ball 23 having a diameter slightly less than that of the tool. This ball rests upon a circular disk 24 directly thereabeneath and slidably supported in a cylindrical bore 25 which forms a coaxial downward continuation of the bore 17. The bore 25 has a diameter approximately equal to that of the tool 21. A screw 27 is threaded through the bar 15 in axial alignment with the bore 25, and extends into the said bore to engage the lower surface of the disk 24 and form an adjustable support therefor. A passage 28 extends through the bar 15 and leads to an opening 29 in the wall of the bushing 19, so that oil may be introduced to lubricate the tool 21 and the ball 23.

Figure 3:
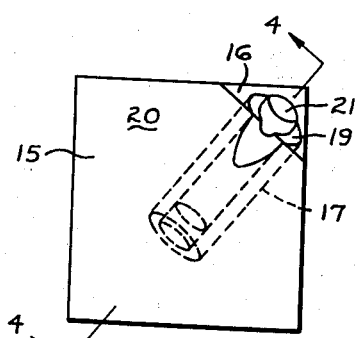
Fig. 3 is an elevation of the tool and its supporting means, taken on the line 3—3 of Fig. 2.
Figure 2:
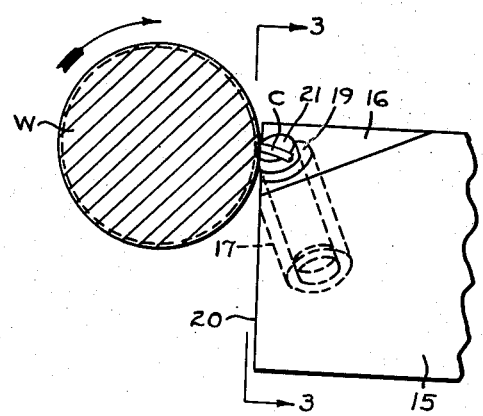
Fig. 2 is a view taken in section on the line 2—2 of Fig. 1.

It will now be apparent from Fig. 3 that the axis of the cylindrical tool 21 has an appreciable tilt forwardly toward the zone of chip formation, and since the rake surface on the upper end of the tool lies at right angles to the axis this tends to provide a negative rake and a positive clearance. It will also be apparent from Fig. 2 that if a radial line were drawn from the center of the work piece W to the center of the upper end or rake surface of the tool 21, this line would make an obtuse angle with the axis of the tool. Consequently the tool may be described as located "below center" with respect to the work, an "on center" position corresponding to a ninety degree angle. The below center position for a tool which is turning an external surface increases the negative rake and the positive clearance. This arrangement is particularly advantageous when the depth of cut is relatively small. The effect of the negative rake is to cause the chip C to travel across the lower portion of the inclined circular rake surface, and below the center thereof, as shown in Figs. 1 and 2. The friction of the chip against the rake surface will cause the tool 21 to rotate within the bushing 19 at a speed dependent upon the surface speed of the work piece W. The pressure of the chip against the tool will urge the tool downwardly with a considerable axial thrust, but this will produce very little resistance to rotation since the pressure will be received by the ball 23, which will roll around freely against the inner surface of the bushing 19 and the upper surface of the disk 24 in a small circular orbit. Hence tool rotation will be maintained by the frictional engagement of the chip with the rake surface despite the relatively small diameter of the cutting edge, and the relatively small radius at which the frictional force is required to act. Because the cutting edge is relatively small in diameter, the tool will operate smoothly and without appreciable chatter, as explained above, and this will increase the tool life and produce a smoother finish on the work. The rotation of the tool will cause the cutting edge to remain much cooler and at a more uniform temperature, and if liquid coolant or lubricant is applied to the cutting edge such lubricant will be carried into the region where the cutting action occurs. Even without the use of a liquid coolant, it has been found that the invention makes it feasible to operate at enormously increased cutting speeds. By way of example tests have shown that when cutting certain alloy steels with tools of cemented tungsten carbide, the cutting speed, heretofore limited to approximately 350 feet per minute, can be increased to at least 1600 feet per minute by means of this invention, and the life of the tools as measured by the relative travel of the tool and work piece can be increased from say 3 miles to 6 or 8 miles.

The tool 21 has a cylindrical clearance surface and a plane rake surface. This is a very simple geometrical shape which can readily be formed of cemented tungsten carbide. When the cutting edge of the tool 21 becomes dull, the tool can be quickly withdrawn from the bushing 19 and turned end for end to provide a new cutting edge, or a new tool may be inserted, with very little interruption to production. The dull cutting edge can be readily sharpened by grinding material from the plane rake surface by means of a diamond wheel. Many such grindings are possible before the tool will become too short for further use.

Figure 5:
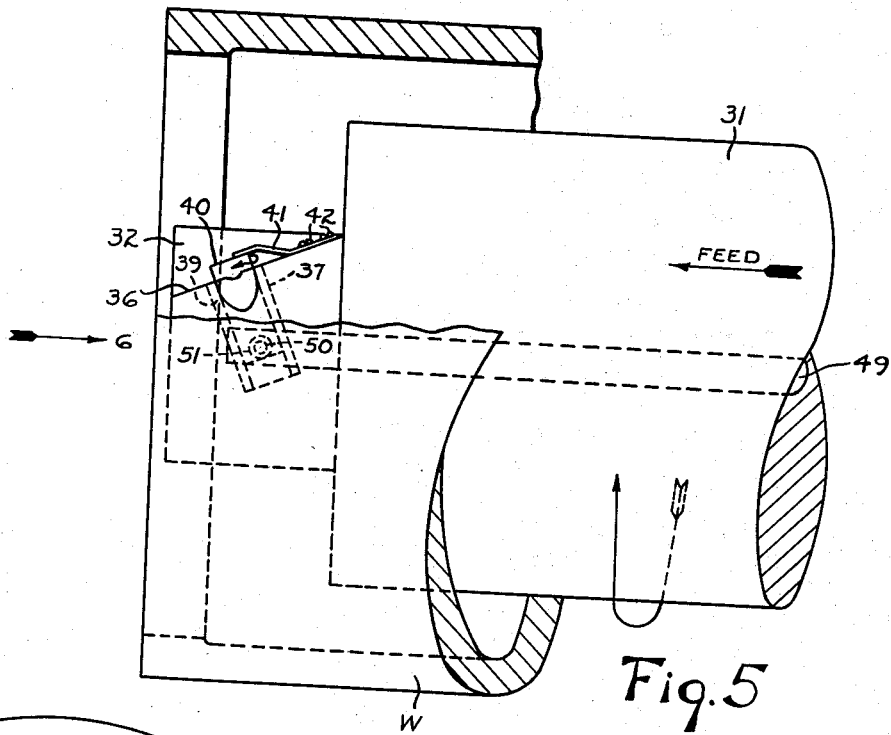
Fig. 5 is an elevation, partly broken away, showing a rotatable tool mounted upon a rotating boring bar and in operation boring an internal cylindrical surface within a stationary work piece, the tool having a forward tilt.
Figure 6:
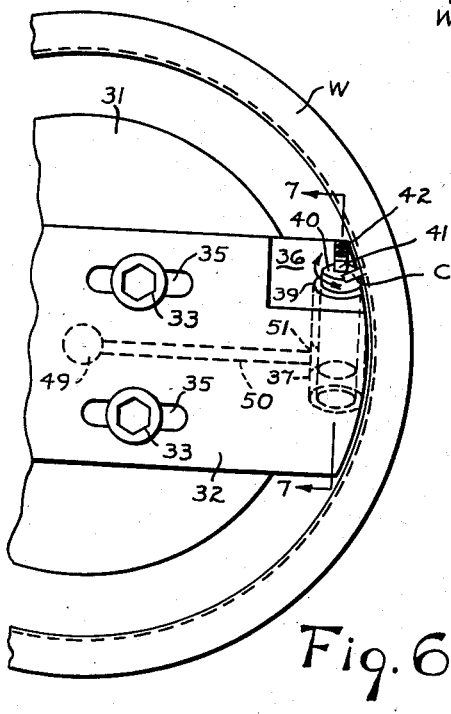
Fig. 6 is an elevation taken as indicated by the arrow 6 in Fig. 5.
Figure 7:
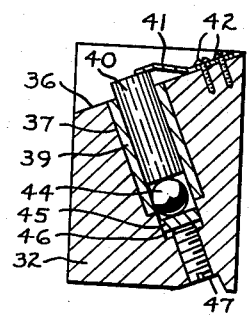
Fig. 7 is a view taken in section on the line 7—7 of Fig. 6.

Referring now to Figs. 5, 6 and 7, the invention is shown as applied to machining a cylindrical bore in a stationary work piece W. This embodiment comprises a heavy rotatable boring bar 31 arranged to be moved in the direction indicated by the arrow marked "Feed" in Fig. 5. A tool supporting block 32 is attached to the front end of the bar 31 by means of screws 33 which extend through parallel slots 35 in the block. The block is provided with an inclined plane surface 36 adjacent one end, and with a cylindrical bore 37 extending into the block in a direction perpendicular to the surface 36. Within this bore there is tightly fitted a cylindrical bushing 39 of cemented tungsten carbide or other suitable material. A rotatable cylindrical tool 40, preferably of cemented tungsten carbide, is mounted with a close running fit in the bushing 39 and extends somewhat outwardly therefrom beyond the surface 36. The projecting end of the tool provides a plane circular rake surface perpendicular to the axis of the tool. A small clip 41 is attached to the block 32 by screws 42 in position to overlie the rake surface of the tool and prevent the tool from being thrown out of the bushing by centrifugal force. The inner end of the tool 40 is spaced from the adjacent end of the bushing by a distance slightly exceeding the radius of the tool, and engages a spherical ball 44 having a diameter slightly less than that of the tool. This ball rests on a circular disk 45 slidably mounted in a cylindrical bore 46 which forms a coaxial continuation of the bore 37. The bore 46 has a diameter approximately equal to that of the tool 40. A screw 47 is threaded through the block 32 in axial alignment with the bore 46 and extends into the said bore to engage the disk 45 and form an adjustable support therefor. A passage 49 extends along the axis of the boring bar 31 and into the block 32 to intersect a radial passage 50 leading to an opening 51 in the side of the bushing 39, so that lubricating oil may be supplied to the interior of the bushing.

It will be noted from Fig. 5 that the axis of the tool 40 is tilted somewhat forwardly toward the zone of chip formation, which provides a negative rake and a positive clearance. It will also be noted from Fig. 6 that if a radial line were drawn from the center of the boring bar 31 to the center of the circular rake surface of the tool, this line would make an acute angle with the axis of the tool. Consequently the tool may be described as located "above center" with respect to the work, an "on center" position corresponding to a ninety degree angle. The above center position for a tool which is boring an internal surface increases the negative rake and the positive clearance in the radial direction. Because of the negative rake in both the radial and feed directions, the chip C will travel across the rake surface of the tool at one side of the center thereof, as indicated in Fig. 6, and the friction of the chip will cause the tool to rotate about its axis. This rotation is made possible by the anti-friction thrust bearing formed by the ball 44. This ball will receive the thrust of the tool and roll on the disk 45 in a small circular orbit within the confines of the surrounding bushing 39. This embodiment has the same advantages with respect to the tool life and cutting speed as have been described in connection with the embodiment of Fig. 1.

Figure 8:
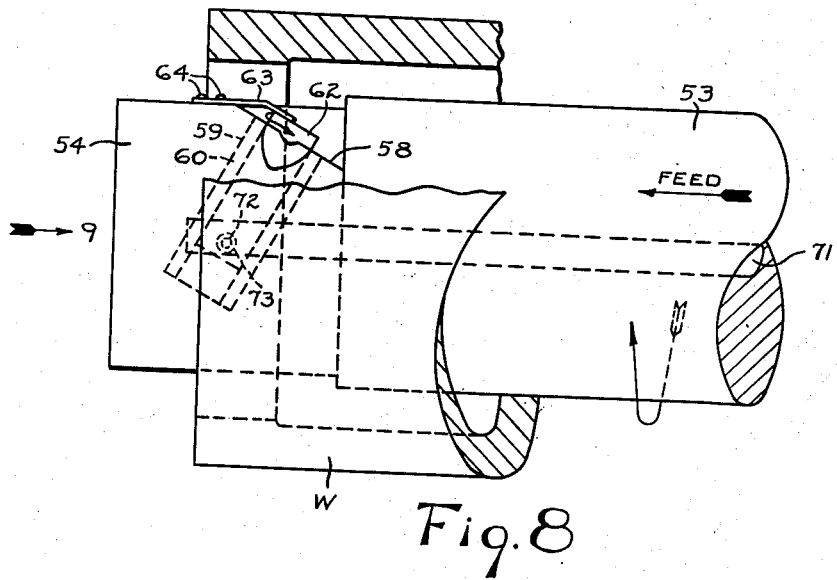
Fig. 8 is an elevation, partly broken away, showing a rotatable tool mounted upon a rotating boring bar and in operation boring an internal cylindrical surface within a stationary work piece, the tool having a rearward tilt.
Figure 9:
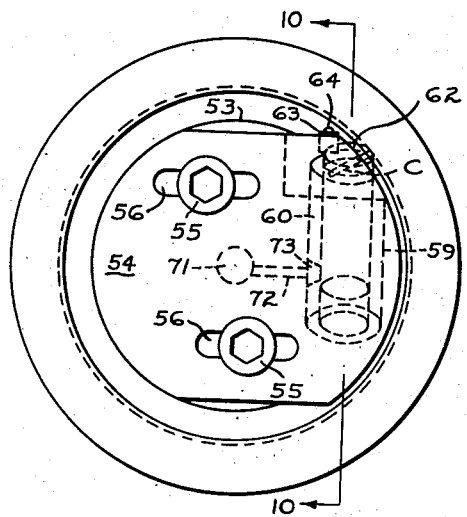
Fig. 9 is an elevation taken as indicated by the arrow 9 in Fig. 8.
Figure 10:
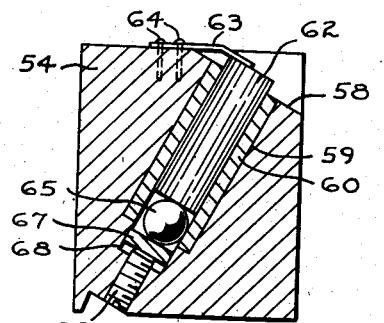
Fig. 10 is a view taken in section on the line 10—10 of Fig. 9.

Referring now to Figs. 8, 9 and 10, there is shown a modification of the construction shown in Fig. 5. In this modification there is provided a rotatable boring bar 53 arranged to be moved forwardly in the direction of the arrow marked "Feed" in Fig. 8, in order that a cylindrical hole may be bored in a stationary work piece W. A tool supporting block 54 is fastened to the front end of the bar 53 by means of screws 55 which extend through parallel slots 56 in the block. The block is provided with an inclined plane surface 58 adjacent one end, and a cylindrical bore 59 extends into the block in a direction perpendicular to the surface 58. A cylindrical bushing 60 fits tightly within the bore 59, and a rotatable cylindrical tool 62 is mounted within the bushing with a close running fit. Both the bushing and the tool may be formed of cemented tungsten carbide. The outer end of the tool extends somewhat beyond the surface 58 and provides a plane circular rake surface perpendicular to the axis of the tool. A small clip 63 is fastened to the block 54 by screws 64 in position to overlie the rake surface and prevent the tool from being thrown out of the bushing by centrifugal force. The inner end of the tool is spaced from the adjacent end of the bushing by a distance slightly exceeding the radius of the tool, and engages a spherical ball 65 having a diameter slightly less than that of the tool. The ball 65 is supported by a circular disk 67 which is slidably mounted in a cylindrical bore 68 forming a coaxial continuation of the bore 59 and having a diameter approximately equal to that of the tool 62. A screw 69 is threaded through the block 54 in axial alignment with the bore 68 and extends into the same to engage the disk 67 and provide an adjustable support therefor. A passage 71 extends along the axis of the boring bar 53 and into the block 54 to intersect a radial passage 72 leading to an opening 73 in the side of the bushing 60, so that lubricating oil may be supplied to the interior of the bushing.

From inspection of Fig. 8 it will be apparent that the axis of the tool 62 is tilted somewhat rearwardly, away from the zone of chip formation, which provides a positive rake and a negative clearance in the feeding direction. From inspection of Fig. 9 it will be clear that the tool 62 is positioned "above center," since a radial line extending from the axis of the boring bar 53 to the center of the circular rake surface of the tool would meet the axis of the tool at an acute angle. This provides a negative rake and a positive clearance in the radial direction. The positive rake in the feeding direction counteracts the negative radial rake, and results in a normal rake at the point of chip formation. The positive radial clearance counteracts the negative clearance in the feeding direction, and results in a proper clearance, with no rubbing of the cylindrical clearance surface of the tool against the work piece. As indicated in Fig. 9, the chip C will travel across the flat rake surface of the tool at one side of the center thereof, and the tool will be rotated by the friction of the chip on such surface. This is rendered possible, despite the small diameter of the tool, by the provision of the anti-friction thrust ball 65, which will simply roll in a small circular path on the disk 67 and against the inner surface of the surrounding bushing 60. By eliminating excessive negative rake at the point of chip formation, this arrangement has advantages in that a better cutting action is obtained and an improved surface finish is provided in the bored hole.

Figure 11:
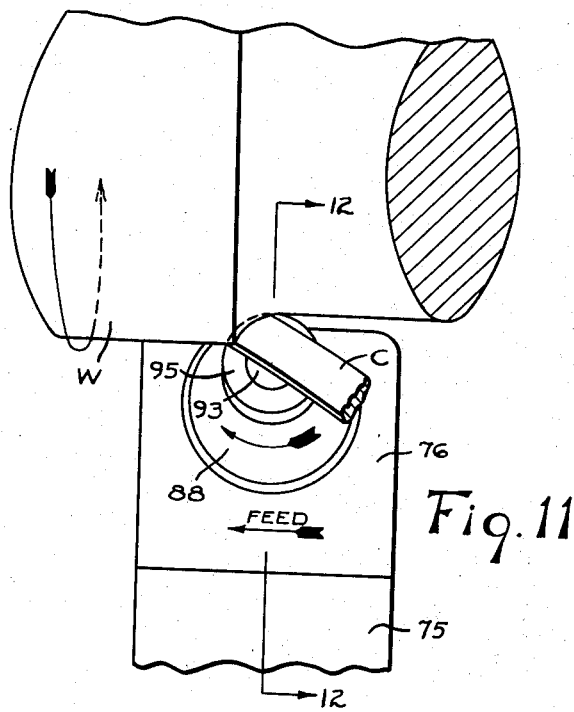
Fig. 11 is a plan view of a modified form of rotatable tool in operation turning an external cylindrical surface on a rotating work piece, the tool having no forward or rearward tilt.
Figure 12:
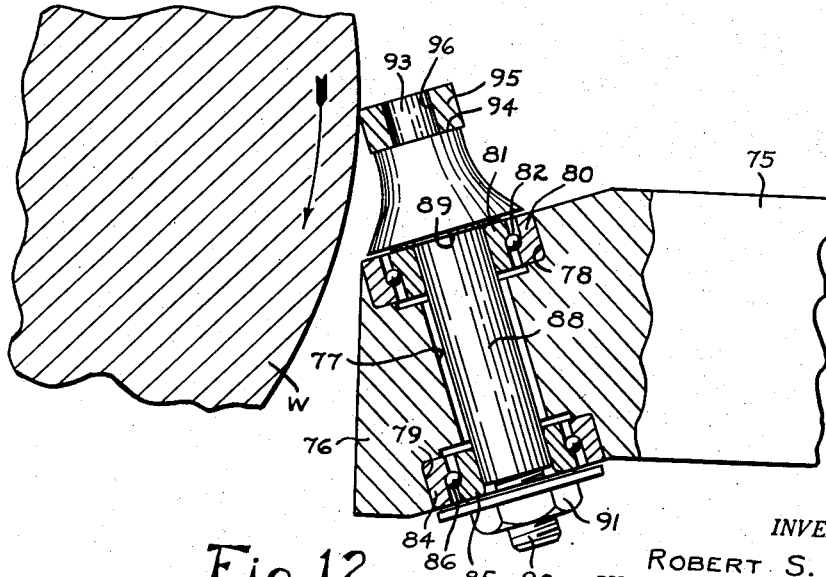
Fig. 12 is a view taken in section on the line 12—12 of Fig. 11.

In Figs. 11 and 12 there is shown a construction which is particularly adapted for turning a heavy chip from the outer surface of a rotating work piece W. This embodiment comprises a heavy generally horizontal bar 75 with its end portion 76 bent downwardly adjacent the work piece, the bar being arranged for movement laterally as indicated by the arrow marked "Feed" in Fig. 11. The end portion 76 has a bore 77 extending therethrough, the axis of the bore being inclined upwardly in a direction toward the work piece and lying in a plane substantially perpendicular to the axis of the work piece. The upper end of the bore 77 is formed with a counterbore 78, and its lower end is formed with a counterbore 79. Within the upper counterbore 78 there is mounted an annular antifriction bearing of the combined radial and thrust type comprising an outer race 80, an inner race 81, and an annular row of spherical balls 82 between the races. Within the lower counterbore 79 there is mounted another annular anti-friction bearing of the combined radial and thrust type comprising an outer race 84, an inner race 85, and an annular row of spherical balls 86 between the races. A spindle 88 extends through the inner races 81 and 85, and is supported thereby. This spindle is shaped to provide a downwardly facing shoulder 89 which engages the upper surface of the upper inner race 81, and the lower portion 90 of the spindle is threaded to receive a nut 91 which engages the lower surface of the lower inner race 85. The upper bearing is constructed to receive downward thrust on the spindle, whereas the lower bearing is constructed to resist any upward movement of the spindle. These bearings may be packed with grease. The upper portion of the spindle 88 is shaped to provide an upwardly extending cylindrical projection 93 coaxial with the remainder of the spindle and surrounded by an upwardly facing annular shoulder 94. The projection 93 is surrounded by an annular tool 95 of cemented tungsten carbide or the like, this tool having a central cylindrical hole 96 to fit the projection 93 closely. The outer peripheral surface of the tool 95 is cylindrical and forms a clearance surface. The upper surface of the tool is plane and forms a rake surface which lies at right angles with the tool axis and intersects the clearance surface of the tool to form a circular cutting edge. The plane lower surface of the tool engages the shoulder 94 of the spindle, this shoulder being effective to support the tool against the downward thrust of the chip C.

As will be apparent from Fig. 12, a line extending radially from the axis of the work piece to the center of the upper or rake surface of the tool 95 would intersect the axis of the tool at an obtuse angle, which produces a negative rake and corresponds to a "below center" position for a turning tool. This provides a considerable positive clearance and avoids interference between the work piece and the inner end of the bar 75. As indicated in Fig. 11, the chip C will travel across the rake surface of the tool in a tangential path, and the tool and spindle will be rotated by the tangential frictional force applied to the tool by the chip. It will be noted that the outside diameter of the tool 95 is less than the inside diameter of the outer races 80 and 84 forming the stationary portions of the bearings. Chip rotation of a tool having such a relatively small diameter is made possible by supporting the tool and spindle against the thrust of the chip by means of the rolling anti-friction elements 82.

It will be seen that each of the several constructions illustrated includes a tool having a cylindrical clearance surface and a plane rake surface which intersect to form a circular cutting edge. Each tool is supported radially by a bearing having a stationary annular element with a diameter exceeding that of the cutting edge, and each tool is supported against axial thrust by means of a rolling anti-friction element. The relatively small diameter of the cutting edge is of great importance in that it avoids the excessive chattering which has heretofore ruined the surface finish of the work piece and shortened the life of the tool. The anti-friction thrust support is likewise of great importance in that it makes automatic rotation of the tool by chip action possible, despite the small tool diameter. By combining these two features the invention makes it practical to operate tungsten carbide tools at enormously increased cutting speeds and at the same time obtain far greater tool life as measured by the relative length of travel between the tool and the work piece. Thus tremendous savings in the cost of removing metal by turning, boring, facing, and similar operations, are made possible.

Having thus described my invention, what I claim as new and desire to secure by Letters Patent is:

1. An apparatus for cutting metals comprising a cylindrical tool formed of cemented tungsten carbide having a plane end surface perpendicular to the axis of the cylinder, the other end of the tool being a plane surface perpendicular to the axis of the cylinder to permit reversal of the cutter and to provide a thrust bearing surface, bearing means to support the tool for free rotation about its axis and including a cemented tungsten carbide bushing, the bearing means further including a rolling anti-friction element contacting the said other end to receive thrust, the tool being rotated by the action of the chip thereon, a spring clip pressing resiliently against the first end to hold the tool in place against the anti-friction element, and a threaded member coaxial with said tool acting through the anti-friction element to adjust the tool axially.

2. An apparatus for cutting metals comprising a cylindrical tool formed of tungsten carbide having a plane end surface perpendicular to the axis of the cylinder, the other end of the tool being a plane surface perpendicular to the axis of the cylinder to permit reversal of the cutter and to provide a thrust bearing surface, bearing means to support the tool for free rotation about its axis and including a tungsten carbide bushing, the bearing means further including an anti-friction element contacting the said other end with substantially point contact to receive thrust, the tool being rotated by the action of the chip thereon, and a threaded member coaxial with said tool acting through the anti-friction element to adjust the tool axially.

3. An apparatus for cutting metals comprising a cylindrical tool formed of tungsten carbide having a plane end surface perpendicular to the axis of the cylinder, the other end of the tool being a plane surface perpendicular to the axis of the cylinder to permit reversal of the cutter and to provide a thrust bearing surface, bearing means to support the tool for free rotation about its axis and including a tungsten carbide bushing, the bearing means further including an anti-friction element contacting the said other end with substantially point contact to receive thrust, the tool being rotated by the action of the chip thereon, the said bushing extending axially beyond the said other end of the tool to provide a housing for the anti-friction element, and a threaded member coaxial with said tool acting through the anti-friction element to adjust the tool axially.

ROBERT S. HAHN.

References Cited in the file of this patent

UNITED STATES PATENTS

| Number | Name | Date |
| --- | --- | --- |
| 543,551 | Hartness | July 30, 1895 |
| 952,158 | Wattie | Mar. 15, 1910 |
| 2,127,523 | Kraus | Aug. 23, 1938 |
| 2,233,724 | Bannister et al. | Mar. 4, 1941 |
| 2,359,954 | Whipple | Oct. 10, 1944 |
| 2,551,167 | Rolland | May 1, 1951 |

FOREIGN PATENTS

| Number | Country | Date |
| --- | --- | --- |
| 166 | Great Britain | Jan. 17, 1868 |
| 603,968 | Great Britain | June 25, 1948 |
| 618,696 | Great Britain | Feb. 25, 1949 |